United States Patent
Lin et al.

(10) Patent No.: US 10,097,024 B2
(45) Date of Patent: Oct. 9, 2018

(54) CONTROL SYSTEM AND CONTROL METHOD FOR A PHASE SHIFTED FULL BIDGE CHARGER

(71) Applicant: CRRC QINGDAO SIFANG ROLLING STOCK RESEARCH INSTITUTE CO., LTD., Qingdao (CN)

(72) Inventors: Xianqi Lin, Qingdao (CN); Lijun Zhang, Qingdao (CN); Xuqiang Zhao, Qingdao (CN); Shiying Sun, Qingdao (CN)

(73) Assignee: CRRC QINGDAO SIFANG ROLLING STOCK RESEARCH INSTITUTE CO., LTD., Shandong (CN)

( * ) Notice: Subject to any disclaimer, the term of this patent is extended or adjusted under 35 U.S.C. 154(b) by 0 days.

(21) Appl. No.: 15/737,714

(22) PCT Filed: Dec. 12, 2016

(86) PCT No.: PCT/CN2016/109409
§ 371 (c)(1),
(2) Date: Dec. 18, 2017

(87) PCT Pub. No.: WO2017/148201
PCT Pub. Date: Sep. 8, 2017

(65) Prior Publication Data
US 2018/0183244 A1      Jun. 28, 2018

(30) Foreign Application Priority Data
Aug. 17, 2016 (CN) .......................... 2016 1 0688741

(51) Int. Cl.
*H02J 7/00* (2006.01)
*H01M 10/44* (2006.01)
*H02M 1/36* (2007.01)

(52) U.S. Cl.
CPC ............ *H02J 7/007* (2013.01); *H01M 10/44* (2013.01); *H02M 1/36* (2013.01); *H02J 7/0029* (2013.01);
(Continued)

(58) Field of Classification Search
CPC . Y02E 60/12; H02J 7/14; H02J 7/0068; H02J 7/007; H02J 7/0029; H02J 7/0047;
(Continued)

(56) References Cited

U.S. PATENT DOCUMENTS

| | | | |
|---|---|---|---|
| 2008/0203974 A1* | 8/2008 | Manai | H02J 7/0073 320/160 |
| 2013/0127415 A1 | 5/2013 | Ohtomo | 320/109 |
| 2015/0043117 A1* | 2/2015 | Xiang | H02H 3/10 361/91.5 |

FOREIGN PATENT DOCUMENTS

| | | |
|---|---|---|
| CN | 201234156 Y | 5/2009 |
| CN | 101557121 A | 10/2009 |

(Continued)

OTHER PUBLICATIONS

International Search Report of corresponding International PCT Application No. PCT/CN2016/109409, dated Jun. 1, 2017.

*Primary Examiner* — Yalkew Fantu
*Assistant Examiner* — Mohammed J Sharief
(74) *Attorney, Agent, or Firm* — J.C. Patents

(57) ABSTRACT

A control system and control method for a phase shifted full bridge charger, wherein, the control system comprising a sampling system and a charger controller, the charger controller comprises a start and running determination unit, a soft start control unit, a running control unit and a smooth switchover control unit; the running control unit comprises a mode determination unit, a constant-voltage control unit, a total-current-limiting control unit and a charging-current-limiting control unit. During the operation of the charger, after soft start ends, switching occurs between a constant-voltage running state, a total-current-current-limiting running state and a charging-current-limiting running state (Continued)

according to differences in conditions, and the smooth switchover control unit enables the controller to switch between the operation states according to differences charger operation states to realize smooth switching within the charger control method and have high steady-state performance and dynamic performance.

12 Claims, 6 Drawing Sheets

(52) U.S. Cl.
CPC ..... *H02J 7/0047* (2013.01); *H02J 2007/0039* (2013.01)

(58) Field of Classification Search
CPC ........... H02J 2007/0039; H01M 10/44; H01M 10/441; H02M 1/36
USPC ......................................................... 320/162
See application file for complete search history.

(56) References Cited

FOREIGN PATENT DOCUMENTS

| CN | 203423529 U | * | 2/2014 |
|----|-------------|---|--------|
| CN | 203423529 U |   | 2/2014 |
| CN | 106208238 A |   | 12/2016 |

* cited by examiner

US 10,097,024 B2

CONTROL SYSTEM AND CONTROL METHOD FOR A PHASE SHIFTED FULL BIDGE CHARGER

CROSS REFFERENCE TO RELATED APPLICATION

This application is a national phase application of international application No. PCT/CN2016/109409 filed on Dec. 12, 2016, which in turn claims the priority benefits of Chinese application No. 201610688741.2, filed Aug. 17, 2016. The contents of these prior applications are hereby incorporated by reference in their entirety.

TECHNICAL FIELD

The present invention belongs to the technical field of control to chargers, and relates to a control system and control method for a phase shifted full bridge charger having multiple running modes.

BACKGROUND OF THE INVENTION

Train chargers are used to supply power to all the DC loads in the train and charge storage batteries. According to different operating conditions of a train, a charger has multiple running modes, specifically including a constant-voltage mode, a charging-current-limiting mode and a total-current-limiting mode. To ensure the stable operation of a charger, each running mode corresponds to different control strategies, that is, a constant-voltage control strategy, a charging-current-limiting control strategy and a total-current-limiting control strategy.

A phase shifted full bridge (PSFB) charger is a charger in which a PSFB converter is used as a soft switch of the charger. The structure of the PSFB charger includes a PSFB circuit, a high frequency transformer and a rectifying circuit, which are connected successively, wherein the PSFB circuit includes a support capacitor and a charging resistor; and an output terminal of the rectifying circuit is connected to the storage battery and loads, respectively, to charge the storage battery and drive the loads to run.

When a train is operating, the PSFB charger is also to be frequently switched between the three running modes. Correspondingly, a control system of the PSFB charger has to respond to the switchover between the running modes in time, so as to perform switchover between the three control strategies in time. Generally, the three control strategies are under PI (Proportional-Integral) control. If three groups of the same proportional parameters and integral parameters are used, the individuality of each running mode cannot be satisfied, and the technical requirements of controlling both the voltage and the current in a steady state cannot be fulfilled. If three groups of different proportional parameters and integral parameters are used, at the moment of switchover between two control strategies, the proportional parameters and the integral parameters are to be switched quickly, thus leading to overshoot in voltage and current when the system is dynamically adjusted, or even damage in extreme situations.

At present, there is no one control method that can ensure smooth switchover of a PSFB charger for a train between different running modes, and also stable operation of the PSFB charger at the moment of and after the switchover between different running modes.

SUMMARY OF THE INVENTION

An objective of the present application is to provide a control system and a control method for smooth switchover between different operating modes of a PSFB charger according to the switchover operation state of a train charger in the prior art.

For this purpose, the present application provides the following technical solution: a control system for a phase shifted full bridge charger is provided, comprising a sampling system and a charger controller; the sampling system comprises an input voltage acquisition device mounted at an input terminal of a charger to acquire an input voltage, a total output voltage acquisition device and a total output current acquisition device both mounted at an output terminal of the charger to respectively acquire a total output voltage and a total output current, and a charging current acquisition device mounted at an input terminal of a storage battery to acquire a charging current.

More specifically, the charger controller comprises:

a start and running determination unit configured to receive a total output voltage signal, a total output current signal, a charging current signal and a duty ratio, and determine whether the charger operates in a waiting state, a pre-charging state, a soft start state or a running state, and generate a corresponding state signal; and the running state comprises a constant-voltage running state, a total-current-limiting running state and a charging-current-limiting running state;

a soft start control unit configured to control the charger during the soft start state of the charger;

a running control unit configured to control the charger in the running state of the charger and determine the running state of the charger;

the running control unit comprises:

a mode determination unit configured to receive a total output voltage value, a total output current value and a charging current value, to determine which running state the charger operates in, and to generate a running state signal of the charger;

a constant-voltage control unit configured to control the charger when the charger operates in the constant-voltage running state;

a total-current-limiting control unit configured to control the charger when the charger operates in the total-current-limiting running state;

a charging-current-limiting control unit configured to control the charger when the charger operates in the charging-current-limiting running state;

the charger controller further comprises a smooth switchover control unit configured to receive the running state signal of the charger fed back by the mode determination unit, and a soft start state signal fed back by the start and running determination unit; when the charger is switched between the soft start state and the running state and between different running states, the control system is smoothly switched to a control unit corresponding to the running state to control a PSFB circuit of the charger.

A charger control method is provided, comprising the following steps:

determining whether the pre-charging of the charger ends; if so, the charger comes into the soft start state, and the operation of the charger is controlled by the soft start control unit;

determining whether the soft start of the charger ends; if so, the charger comes into the running state, the running control unit operates, and the smooth switchover control unit acquiesces in that a control is switched to the constant-voltage control unit;

receiving, by the mode determination unit, the total output voltage value, the total output current value and the charging current value; a total output current limiting value; and configuring, for the mode determination unit, a set value of the charging current, a total output current limiting value, a charging current limiting value, and a reference value of the total output voltage; determining the running state of the charger by the above received values and set values; and feeding an instruction for the running state of the charger back to the smooth switchover control unit;

in the constant-voltage running state, a constant-voltage control algorithm is used, however, When $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, and the smooth switchover control unit controls the switchover to the total-current-limiting control unit; otherwise, when $$\frac{I_{bat}}{I_{bat-ref}} \rangle \frac{V_{out}}{V_{ref}} \text{ and } \frac{I_{bat}}{I_{bat-ref}} \rangle \frac{I_{out}}{I_{out-ref}},$$

the charger comes into the charging-current-limiting running state, and the smooth switchover control unit controls the switchover to the charging-current-limiting control unit; otherwise, the charger is still in the constant-voltage running state;

in the charging-current-limiting running state, a charging-current-limiting control algorithm is used, however, when $$\frac{V_{out}}{V_{ref}} \rangle \frac{I_{out}}{I_{out-ref}} \text{ and } \frac{V_{out}}{V_{ref}} \rangle \frac{I_{bat}}{I_{bat-ref}},$$

the charger comes into the constant-voltage running state, and the smooth switchover control unit controls the switchover to the constant-voltage control unit; otherwise, when $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, and the smooth switchover control unit controls the switchover to the total-current-limiting control unit; otherwise, the charger still operates in the charging-current-limiting running state;

in the total-current-limiting running state, a total-current-limiting control algorithm is used, however, when $$\frac{V_{out}}{V_{ref}} \rangle \frac{I_{out}}{I_{out-ref}} \text{ and } \frac{V_{out}}{V_{ref}} \rangle \frac{I_{bat}}{I_{bat-ref}},$$

the charger comes into the constant-voltage running state, and the smooth switchover control unit controls the switchover to the constant-voltage control unit; otherwise, when $$\frac{I_{bat}}{I_{bat-ref}} \rangle \frac{V_{out}}{V_{ref}} \text{ and } \frac{I_{bat}}{I_{bat-ref}} \rangle \frac{I_{out}}{I_{out-ref}},$$

the charger comes into the charging-current-limiting running state, and the smooth switchover control unit controls the switchover to the charging-current-limiting control unit; otherwise, the charger still operates in the total-current-limiting running state;

In the above formulas, $V_{out}$ denotes the total output voltage value, $V_{out-ref}$ denotes the total output voltage limiting value, $I_{out}$ denotes the total output current value, $I_{out-ref}$ denotes the total output current limiting value, $I_{bat}$ denotes the charging current value. $I_{bat-ref}$ denotes the charging current limiting value, and $V_{ref}$ denotes the reference value of the total output voltage.

Preferably, a support capacitor is provided at an input terminal of the PSFB circuit, and it is determined whether the pre-charging ends by determining the relation between a voltage on the support capacitor in the PSFB circuit of the charger and an input voltage of the charger.

Preferably, a method for determining whether the soft start of the charger ends is as follows: when condition 1 or condition 2 or condition 3 or condition 4 is fulfilled, it is determined that the soft start of the charger ends, wherein:

condition 1, when a cumulative duty ratio is greater than a set value of a duty ratio;

$$\text{duty} = \frac{V_{ref}}{V_1} * N,$$

where duty denotes the set value of the duty ratio, $V_1$ denotes a sampling value for the input voltage, and N denotes a transformation ratio of a charger transformer;

condition 2: the total output voltage $V_{out}$ is greater than a set value of the total output voltage $V_{os}$;

condition 3: the total output current $I_{out}$ is greater than a set value of the total output current $I_{os}$; and condition 4: the charging current $I_{bat}$ is greater than a set value of the charging current $I_{bs}$.

Preferably, $V_{os}=0.98V_{ref}$, $I_{os}=0.98I_{out-ref}$, $I_{bs}=0.98I_{bat-ref}$.

Preferably, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1)$$
$$= u(k-1) + K_P[e(k) - e(k-1)] + \frac{T}{2}K_I[(k) + e(k-1)]$$

where T denotes a sampling frequency;

as for the constant-voltage control algorithm:

$$e(k) = 1 - \frac{V_{out}(k)}{V_{ref}};$$

as for the total-current-limiting control algorithm:

$$e(k) = 1 - \frac{I_{out}(k)}{I_{out-ref}};$$

and, as for the charging-current-limiting control algorithm:

$$e(k) = 1 - \frac{I_{bat}(k)}{I_{bat-ref}};$$

when the soft start ends, the value of the current cumulative duty ratio DUTY is used as an input to the constant-voltage control unit, the total-current-limiting control unit and the charging-current-limiting control unit; wherein DUTY=duty(t)+Δduty.

The present application has the following beneficial effects.

(1) The present application provides a control system and control method for a charger with multiple control units including a soft start control unit, a charging-current-limiting control unit, a total-current-limiting control unit and a constant-voltage control unit. Different control parameters are used in three control units to achieve the optimal stable effect in each running state or operation mode.

(2) The controller of the present application further includes a smooth switchover control unit. When the charger is switched between different operation modes or running states, the smooth switchover of the control parameters (i.e., the control methods) between the control units can be achieved, with a small amount of overshoot and fast response time. Thus, good steady performance and dynamic performance are achieved.

DETAILED DESCRIPTION OF THE INVENTION

The specific implementations of the present application will be further described below in detail with reference to the accompanying drawings.

Figure 1:
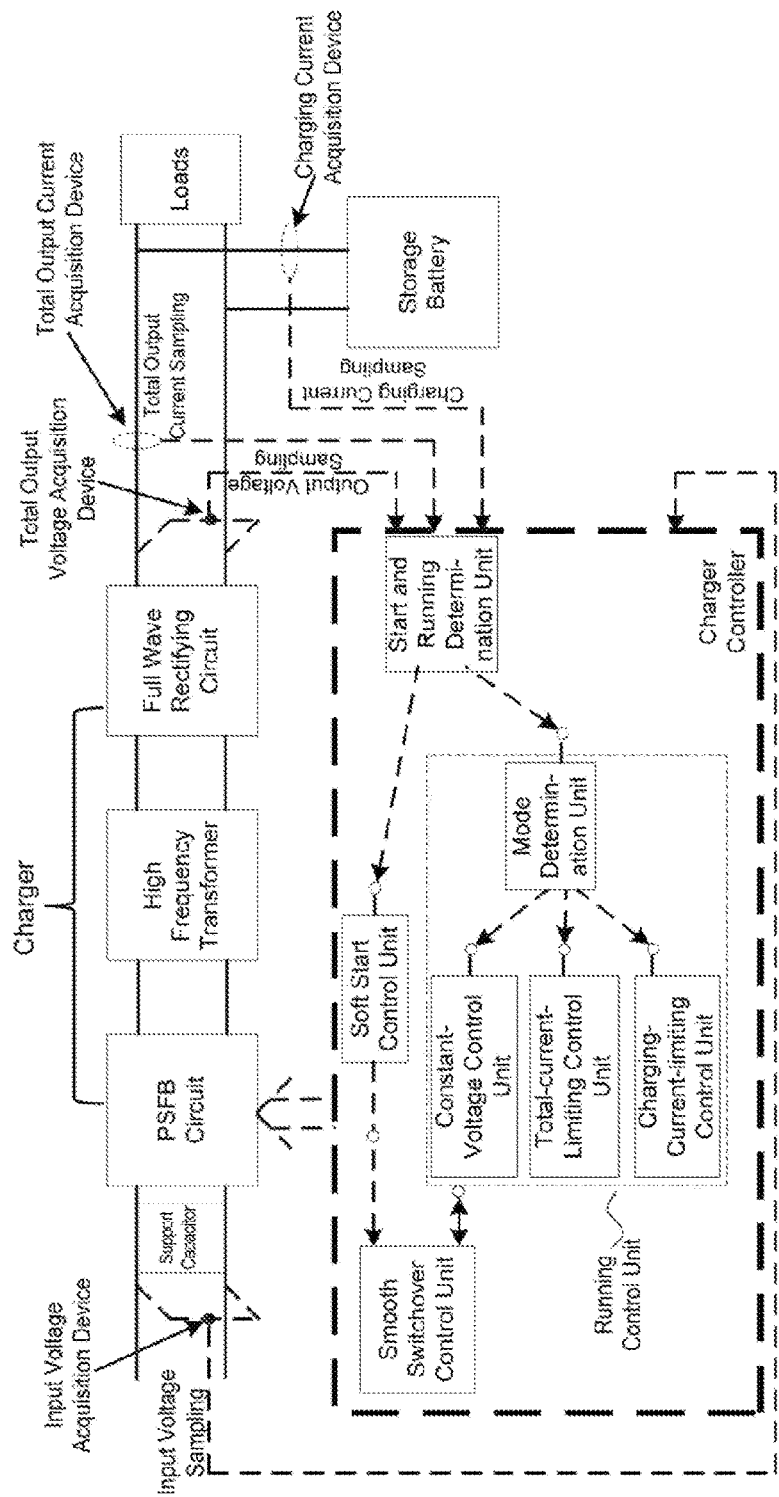
FIG. 1 is a structure block diagram of the system.

As shown in FIG. 1, the structure of the PSFB charger comprises a PSFB circuit, a high frequency transformer and a rectifying circuit, which are connected successively, wherein, an output terminal of the rectifying circuit is connected to a storage battery and loads, respectively, to charge the storage battery and drive the loads to run.

It should be noted that the chargers described in this implementation are all PSFB chargers.

The operating principle of a PSFB charger is as follows:

1. In the PSFB circuit for the charger, a voltage conversion is realized by a PSFB zero-voltage PWM (Pulse Width Modulation) converter, and a high DC voltage is input by the PSFB circuit to output a low DC voltage which is stable and adjustable.

2. A normal operating process of the charger is as follows: firstly, an input DC voltage is detected, and when the start condition is fulfilled, the support capacitor on the input side is pre-charged by a pre-charging resistor. The resistor is removed when the pre-charging of the support capacitor ends, and the soft start begins. During the soft start, a phase-shift angle is increased by a fixed duty ratio to increase the output voltage and current of the charger. When conditions are fulfilled, the charger comes into the running phase. Furthermore, according to the difference in the operating conditions of the charger, the switchover between modes and the running of the mode are realized by using different control strategies.

Figure 2:
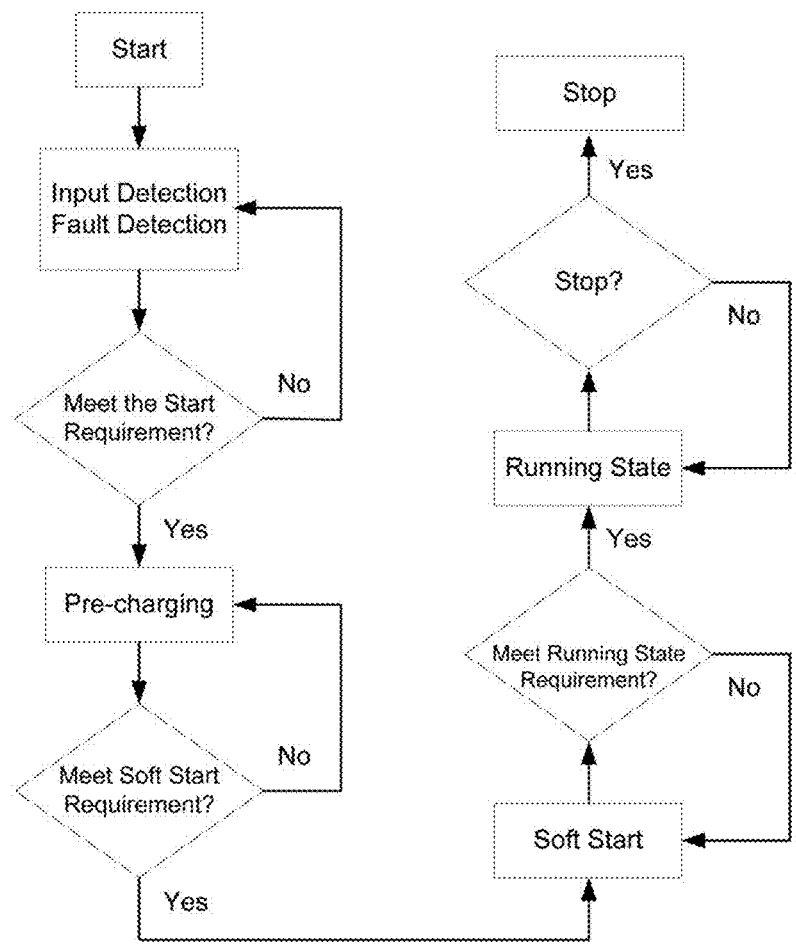
FIG. 2 is a flowchart of start and control of a charger.

FIG. 2 shows a start flowchart of a PSFB charger in a normal operation.

1. Waiting: an input DC voltage is detected, and the charger comes into a next stage when a minimum limiting value for start is reached;

2. Pre-charging: a pre-charging contactor is closed for a period of time (the pre-charging period), then a soft start contactor is closed; and the charger comes into a soft start stage;

3. Soft start: accumulation is performed by a fixed duty ratio so that a PWM wave having a certain phase-shift angle is output by the controller to control a power module; the output voltage and current are gradually increased; and when the operating conditions are fulfilled, the charger comes into a next stage;

4. Running state: comprising a constant-voltage running state, a charging-current-limiting running state and a total-current-limiting running state; the running mode of the charger is determined and then a corresponding PI controller is selected for closed-loop control.

According to the operating principle and the start process of the PSFB charger, the following control system for a PSFB charger is designed.

Still referring to FIG. 1, a control system for a PSFB charger comprises a sampling system and a charger controller; the sampling system comprises an input voltage acquisition device mounted at an input terminal of the charger to acquire an input voltage, a total output voltage acquisition device and a total output current acquisition device both mounted at an output terminal of the charger to respectively acquire a total output voltage and a total output current, and a charging current acquisition device mounted at an input terminal of a storage battery to acquire a charging current. With regard to the sampling system, current and voltage can be acquired by corresponding current sensors and voltage sensors, and corresponding current sampling circuits or voltage sampling circuits can also be designed, etc.

Wherein, the input voltage is an input voltage of the PSFB circuit, and the total output voltage is an output voltage of the full-wave rectifying circuit. The total output voltage is divided into two branches, with one branch used for driving loads and the other branch used for charging the storage battery. The charging current is the current charging the storage battery.

Specifically, the input voltage acquisition device is mounted at a front terminal of the PSFB circuit, i.e., the input terminal of the PSFB circuit, to sample the input voltage; the total output voltage acquisition device is mounted at the output terminal of the full-wave rectifying circuit to sample the total output voltage; the total current acquisition device is also mounted at the output terminal of the full-wave rectifying circuit to sample the total output current; and the charging current sampling device is mounted at the input terminal of the storage battery to sample the charging current of the storage battery.

The charger controller is a device comprehensively controlling the start and running of the charger, comprising the following units:

a start and running determination unit: configuring to receive a total output voltage signal, a total output current signal, a charging current signal and a duty ratio, and determine whether the charger operates in a waiting state, a pre-charging state, a soft start state or a running state, and generate a corresponding state signal, wherein the running state comprises a constant-voltage running state, a total-current-limiting running state and a charging-current-limiting running state; at the beginning of powering on the charger, the charger runs in the waiting state, and the start and running determination unit feeds back a waiting state signal; then the charger comes into the pre-charging state, and the start and running determination unit feeds back a pre-charging state signal; at the end of pre-charging, the charger comes into the soft start state, and the start and running determination unit feeds back a soft start state signal; then the charger comes into the running state; the soft start state signal is indicative of whether the charger still operates in the soft start mode or that the soft start is completed; regardless of the operation state of the charger, if the signal received by the start and running determination unit is indicative of a charger failure or indicates that the operating conditions do not fulfill the operation requirements, for example, overcurrent, overvoltage or the like, the charger comes back to the waiting state;

a soft start control unit: configuring to control the charger during the soft start of the charger. Specifically, the soft start control unit will receive a signal from the start and running determination unit to determine whether the charger operates in the soft start state; and at the end of soft start, the charger will come into the running state;

a running control unit: configuring to control the charger in the running state of the charger and determine different running modes of the charger, wherein, specifically, the running control unit comprises:

a mode determination unit: configuring to receive a total output voltage value (the total output voltage signal), a total output current value (the total output current signal), and a charging current value (the charging current signal) to determine which running state the PSFB charger operates therein and generate a running state signal of the charger;

a constant-voltage control unit: configuring to control the charger when the charger operates in the constant-voltage running state;

a total-current-limiting control unit: configuring to control the charger when the charger operates in the total-current-limiting running state;

a charging-current-limiting control unit: configuring to control the charger when the charger operates in the charging-current-limiting running state.

In addition to the start and running determination unit, the soft start control unit and the running control unit, the charger controller further comprises a smooth switchover control unit configured to receive the running state signal of the charger fed back by the mode determination unit and the soft start state signal fed back by the start and running determination unit. When the charger is switched between the soft start state and the running state and between different running states, the controller is switched to a control unit corresponding to the running state to turn on the connection between the corresponding control unit and the PSFB circuit of the charger.

It should be noted that, what is fed back by the start and running determination unit might be the waiting state signal, the pre-charging state signal, the soft start state signal or the running state signal of the charger. Only when the signal fed back by the start and running determination unit to the smooth switchover control unit is the soft state signal and the running state signal, can the smooth switchover control unit operate. However, when the PSFB charger operates in the waiting state or the pre-charging state, the smooth switchover control unit will not operate.

Specifically, when the charger is switched from the soft start mode to the constant-voltage running mode, the charger controller is smoothly switched to the constant-voltage control unit; and when the charger is switched from the constant-voltage running mode to the total-current-limiting running mode, the charger controller is switched from the constant-voltage control unit to the total-current-limiting control unit. Similarly, when the charger is switched between different running modes, the charger controller is smoothly switched to a control unit matched with the running mode.

Figure 3:
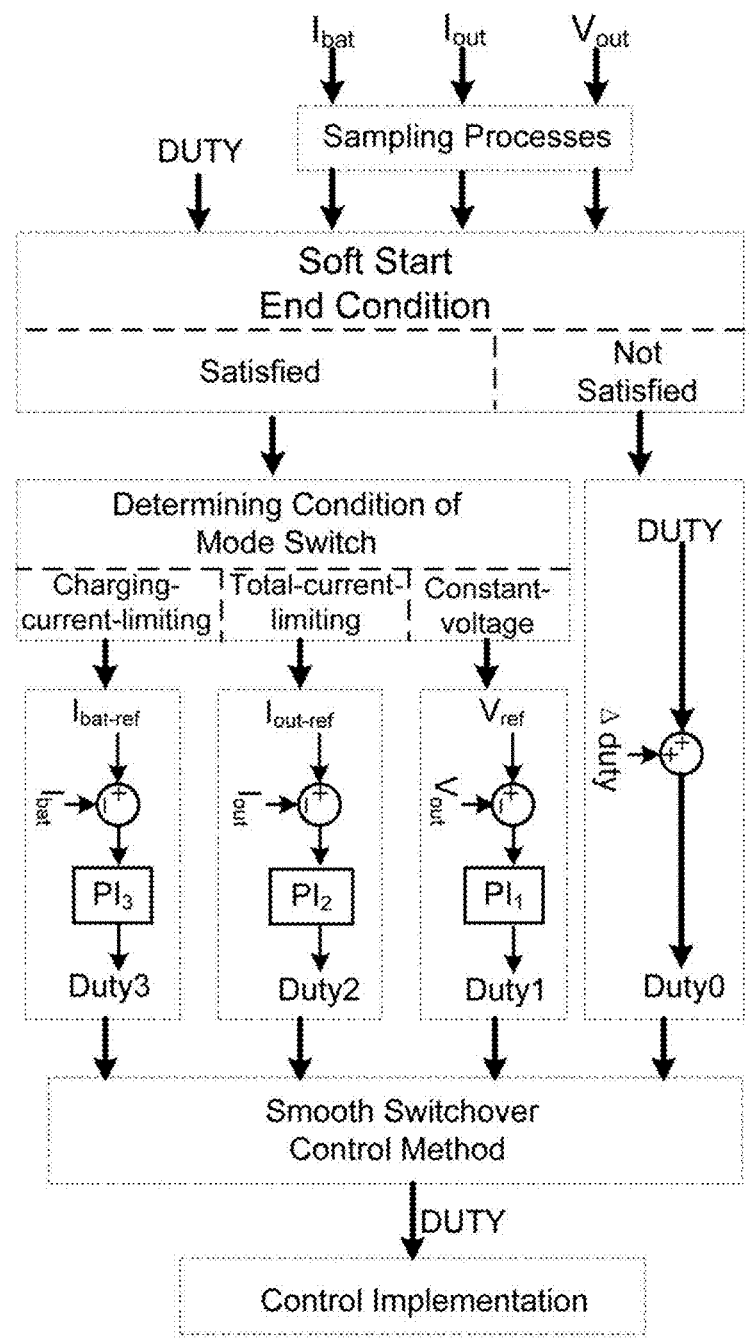
FIG. 3 is a flowchart of control by a controller.

As shown in FIG. 3, the charger control method comprises the following steps:

An advance bridge arm and a lagging bridge arm of the PSFB circuit are controlled by a PWM wave having a duty ratio of 50%. During the soft start, the PWM wave of the lagging bridge arm is lagged from the advance bridge arm by (1-DUTY) circle; and during the running process, the PWM wave of the lagging bridge arm is lagged from the advance bridge arm by (1-DUTY) circle.

As shown in FIG. 3, DUTY is Duty0 during the soft start, and the DUTY is Duty1, or Duty2, or Duty3 during the running process. Duty0 is the value of the duty ratio calculated by a soft start control algorithm, Duty1 is the value of the duty ratio calculated by a constant-voltage control algorithm, Duty2 is the value of the duty ratio calculated by a total-current-limiting control algorithm, and Duty3 is the value of the duty ratio calculated by a charging-current-limiting control algorithm.

After the charger is started, the charger will be pre-charged first. It is determined whether the pre-charging of the charger ends; if so, the charger comes into the soft start state, and the operation of the charger is controlled by the soft start control unit.

Specifically, whether the pre-charging of the charger ends and whether the charger comes into the soft start state are determined according to the signal fed back by the start and running determination unit. Wherein, the specific algorithm used by the start and running determination unit to determine whether the pre-charging ends is as follows.

The support capacitor is provided at the input terminal of the PSFB circuit, and it is determined whether the pre-charging ends by determining the relation between the voltage on the support capacitor at the front terminal of the PSFB circuit for the charger and the input voltage of the charger.

Specifically, the pre-charging time duration is calculated by:

$$t = R * C * \ln\left(\frac{V_1 - V_0}{V_1 - V_t}\right)$$

where R denotes a pre-charging resistor, C denotes a support capacitor, $V_1$ denotes an input DC voltage which can be obtained by sampling, $V_0$ denotes an initial voltage (generally 0) on the support capacitor, $V_t$ denotes a voltage (generally $0.9*V_1$) on the support capacitor C when the pre-charging ends.

If the pre-charging period ends, the charger comes into the soft start process.

It is determined whether the soft start of the charger ends; if so, the charger comes into the running mode and the running control unit operates. At each moment of time, the charger can operate in only one running mode.

Specifically, the determining whether the soft start of the charger ends is according to the signal fed back by the start and running determination unit; and the method about determining whether the soft start of the charger ends by the start and running determination unit is as follows: when condition 1 or condition 2 or condition 3 or condition 4 is fulfilled, it is determined that the soft start of the charger ends, wherein:

condition 1: the sampled duty ratio is accumulated by the start and running determination unit, and when the cumulative duty ratio DUTY is greater than a set value of the duty ratio; wherein:

$$duty = \frac{V_{ref}}{V_1} * N,$$

where duty denotes the set value of the duty ratio, $V_1$ denotes a sampling value of the input voltage, and N denotes a transformation ratio of a charger transformer; and $V_{ref}$ is a reference value of the total output voltage; and DUTY=duty(t)+Δduty condition 2: the total output voltage $V_{out}$ is greater than a set value $V_{os}$ of the output voltage, wherein the set value $V_{os}$ of the total output voltage is a value selected according to experience;

condition 3: the total output current $I_{out}$ is greater than a set value $I_{os}$ of the total output current, wherein the set value $I_{os}$ of the total output current is a value selected according to experience, condition 4: the charging current $I_{bat}$ is greater than a set value $I_{os}$ of the charging current, wherein the set value $I_{bs}$ of the charging current is a value selected according to experience, wherein, $V_{os}$, $I_{os}$ and $I_{bs}$ might be the following values: $V_{os}=0.98V_{ref}$, $I_{os}=0.98I_{out-ref}$, $I_{bs}=0.98I_{bat-ref}$. The above values are empirical values. Actually, the values of $V_{os}$, $I_{os}$ and $I_{bs}$ are not limited to the above values.

It is determined whether the soft start of the charger ends; if so, the charger comes into the running mode, the running control unit operates, and the smooth switchover control unit controls the switchover to the constant-voltage control unit by default.

That is to say, after the soft start of the charger ends, and at the premise that the running state of the charger is not determined by the mode determination unit yet, the running control unit controls the charger by the constant-voltage control unit by default. However, the constant-voltage control unit might not be matched with the running state of the charger, and the running state of the charger is to be determined by the mode determination unit in a next step to quickly make an adjustment of the control unit.

The mode determination unit receives the total output voltage value, the total output current value and the charging current value; a total output current limiting value; and the set value of the charging current, a total output current limiting value, a charging current limiting value, and the reference value of the total output voltage are configured for the mode determination unit. The running state of the charger is determined according to the above received values and the set and reference values, and an instruction for the running state of the charger is fed back to the smooth switchover control unit.

After the soft start ends, the smooth switchover control unit defaults that the charger comes into the constant-voltage running state, to activate the constant-voltage control unit. In the constant-voltage running state, the constant-voltage control algorithm is used, and the constant-voltage control unit operates, however, When $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, and the smooth switchover control unit controls the switchover to the total-current-limiting control unit which operates to switch to the total-current-limiting control algorithm; or otherwise, when $$\frac{I_{bat}}{I_{bat-ref}} \rangle \frac{V_{out}}{V_{ref}} \text{ and } \frac{I_{bat}}{I_{bat-ref}} \rangle \frac{I_{out}}{I_{out-ref}},$$

the charger comes into the charging-current-limiting running state, and the smooth switchover control unit controls the switchover to the charging-current-limiting control unit which operates to switch to the charging-current-limiting control algorithm; or otherwise, the charger is still in the constant-voltage running state;

In the charging-current-limiting running state, the charging-current-limiting control algorithm is used, and the charging-current-limiting control unit operates, however, when $$\frac{V_{out}}{V_{ref}} \rangle \frac{I_{out}}{I_{out-ref}} \text{ and } \frac{V_{out}}{V_{ref}} \rangle \frac{I_{bat}}{I_{bat-ref}},$$

the charger comes into the constant-voltage running state, the smooth switchover control unit controls the switchover to the constant-voltage control unit which operates to switch to the constant-voltage control algorithm; or otherwise, when $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, the smooth switchover control unit controls the switchover to the total-current-limiting control unit which operates to switch to the total-current-limiting control algorithm; or otherwise, the charger still operates in the charging-current-limiting running state;

In the total-current-limiting running state, the total-current-limiting control algorithm is used, and the total-current-limiting control unit operates, however, when $$\left.\frac{V_{out}}{V_{ref}}\right| \frac{I_{out}}{I_{out-ref}} \text{ and } \left.\frac{V_{out}}{V_{ref}}\right| \frac{I_{bat}}{I_{bat-ref}},$$

the charger comes into the constant-voltage control running state, and the smooth switchover control unit controls the switchover to the constant-voltage control unit which operates to switch to the constant-voltage control algorithm; or otherwise, when $$\left.\frac{I_{bat}}{I_{bat-ref}}\right| \frac{V_{out}}{V_{ref}} \text{ and } \left.\frac{I_{bat}}{I_{bat-ref}}\right| \frac{I_{out}}{I_{out-ref}},$$

the charger comes into the charging-current-limiting running state, the charging-current-limiting control unit operates, and the smooth switchover control unit controls the switchover to the charging-current-limiting control unit to switch to the charging-current-limiting control algorithm; or otherwise, the charger still operates in the total-current-limiting running state.

In the above formulas, $V_{out}$ denotes the total output voltage value, $I_{out}$ denotes the total output current value, $I_{out-ref}$ denotes the total output current limiting value, $I_{bat}$ denotes the charging current value, $I_{bat-ref}$ denotes the charging current limiting value, and $V_{ref}$ denotes the reference value of the total output voltage.

The constant-voltage control algorithm, the total-current-limiting control algorithm and the charging-current-limiting control algorithm are all adopt PI controller in which three groups of different PI parameters are used, and $K_p$ and $K_I$ parameters meeting requirements on controlling steady states are selected respectively. However, the selection of PI parameters is known in the prior art and will not be repeated here.

The method for designing a PI controller is as follows.

A transfer function in the s domain of the PI controller is:

$$G(s) = K_P + \frac{K_I}{s},$$

where $K_p$ denotes a proportional coefficient, and $K_I$ denotes an integral coefficient.

A transfer function in the z domain of the PI controller is:

$$\lfloor G(z) = \left(K_P + \frac{K_I}{s}\right)\bigg|_{s=\frac{T}{2}\times\frac{1-z^{-1}}{1+z^{-1}}} = \frac{\left(K_P + \frac{T}{2}K_I\right) + \left(\frac{T}{2}K_I - K_P\right)z^{-1}}{1 - z^{-1}}.$$

Then, a feasible difference equation of the PI controller is further obtained:

$$u(k) = u(k-1) + \left(K_P + \frac{T}{2}K_I\right)e(k) + \left(\frac{T}{2}K_I - K_P\right)e(k-1)$$
$$= u(k-1) + K_P[e(k) - e(k-1)] + \frac{T}{2}K_I[e(k) + e(k-1)]$$

T in the above two formulas denotes the output sampling frequency.

As for the constant-voltage control algorithm $$e(k) = 1 - \frac{V_{out}(k)}{V_{ref}},$$

where $V_{out}(k)$ denotes the current sampling value of the total output voltage of the charger.

As for the total-current-limiting control algorithm $$e(k) = 1 - \frac{I_{out}(k)}{I_{out-ref}},$$

where $I_{out}(k)$ denotes the current sampling value of the total output current of the charger.

As for the charging-current-limiting control algorithm $$e(k) = 1 - \frac{I_{bat}(k)}{I_{bat-ref}},$$

where $I_{bat}(k)$ denotes the current sampling value of the charging current.

when the soft start ends, the value of the current cumulative duty ratio DUTY is used as an input to the constant-voltage control unit, the total-current-limiting control unit and the charging-current-limiting control unit, as the u(k−1) in the three control algorithms, and DUTY=duty(t)+Δduty. Control to the soft start of the charger is open-loop control.

Wherein, duty(t) denotes the real-time value of the duty ratio at t moment, Δduty denotes the variation value of the duty ratio.

When the charger comes into the constant-voltage mode, first, it is determined whether $V_{ref}$ is less than the set value of the total output voltage which is a target value of the total output voltage (i.e., $V_{out}$) of the charger, wherein the reference value $V_{ref}$ of the voltage changes over time; if $V_{ref}$ is less than the set value, the $V_{ref}$ is accumulated in a fixed step size to gradually approximate the set value of $V_{out}$, so that the total output voltage gradually approximates the set value; if not, the $V_{ref}$ is equal to the set value, and then constant-voltage control is performed. When the running state of the charger is switched from the constant-voltage running mode to the charging-current-limiting running mode, the output u(k) of the constant-voltage control unit at the moment of switchover is used as u(k−1) of the charging-current-limiting control unit, and the e(k) of the charging-current-limiting control unit in the first time is calculated; similarly, when the charger is switched from the constant-voltage running mode to the total-current-limiting running mode, the output u(k) of the constant-voltage control unit at the moment of switchover is used as u(k−1) of the total-current-limiting control unit, and the e(k) of the total-current-limiting control unit in the first time is calculated.

The charger comes into the total-current-limiting running mode, and the total-current-limiting control is directly performed. When the charger is switched from the total-current-limiting running mode to the charging-current-limiting running mode or the constant-voltage running mode, the output u(k) of the total-current-limiting control unit is given to the charging-current-limiting control unit or the constant-voltage control unit as u(k−1) respectively, and the e(k) of the charging-current-limiting control unit or the e(k) of the constant-voltage control unit in the first time is calculated.

The charger comes into the charging-current-limiting mode, and the charging-current-limiting control is directly performed. When the charger is switched from the charging-current-limiting running mode to the total-current-limiting running mode or the constant-voltage running mode, the output u(k) of the charging-current-limiting control unit is given to the total-current-limiting control unit or the constant-voltage control unit as u(k−1) respectively, and the e(k) of the total-current-limiting control unit or the e(k) of the constant-voltage control unit in the first time is calculated.

Figure 4:
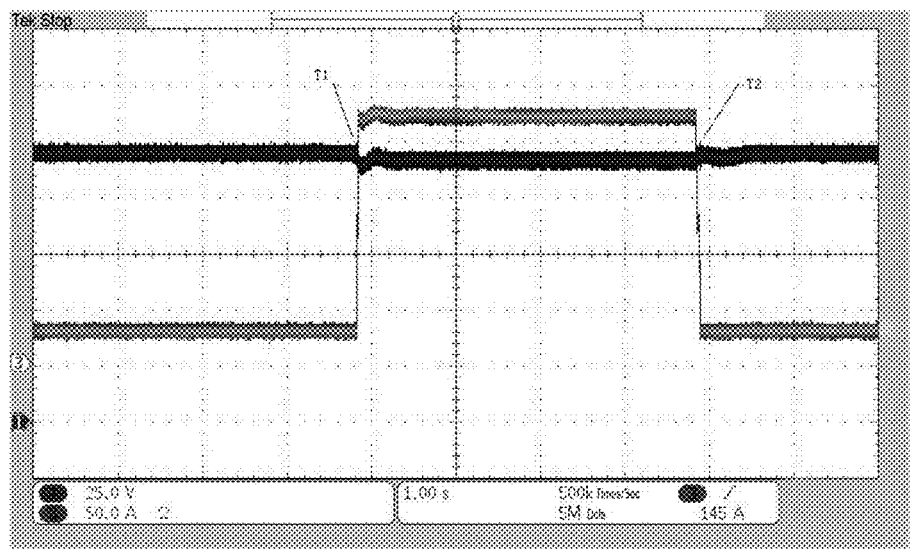
FIG. 4 is a waveform diagram of a total output voltage and a total output current of the charger, when the charger is switched between a constant-voltage running state and a total-current-limiting running state.
Figure 5:
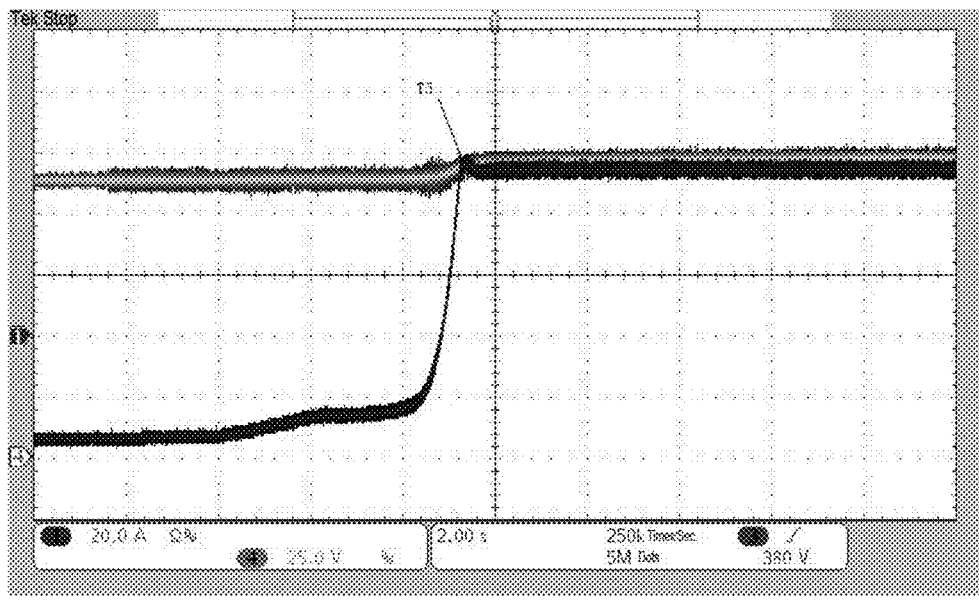
FIG. 5 is a waveform diagram of a total output voltage and a total output current of the charger, when the charger comes into a charging-current-limiting running state after a soft start ends.
Figure 6:
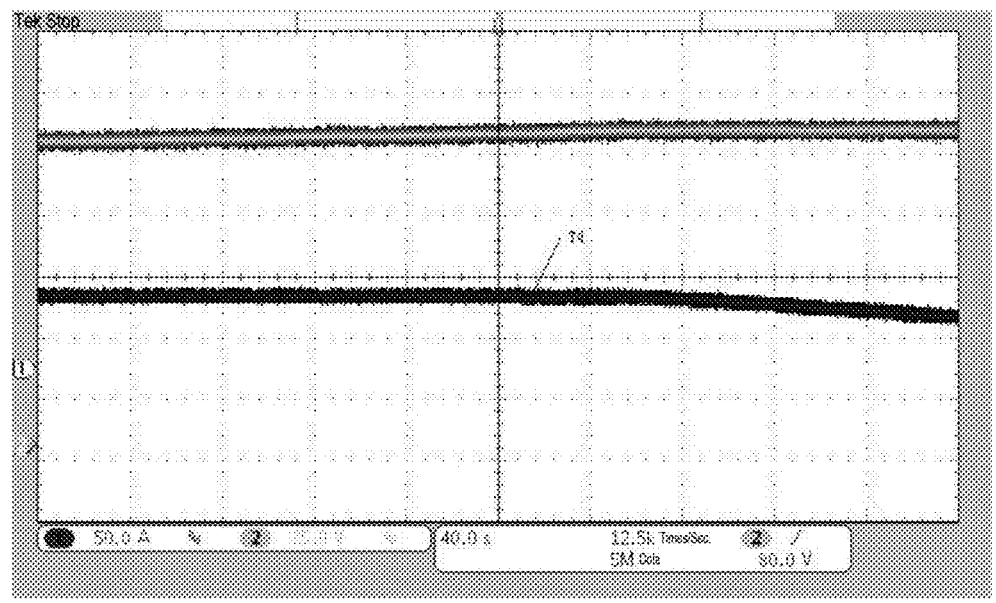
FIG. 6 is a waveform diagram of a total output voltage and a total output current of the charger, when the charger comes into a constant-voltage running state from a charging-current-limiting running state.

Simulated control experiments are performed on the charger by the control system and the control method of the present application, the output waveforms are observed by an oscilloscope to obtain FIG. 4, FIG. 5 and FIG. 6.

FIG. 4 shows an output waveform diagram of the charger, when the charger is switched between the constant-voltage running state and the total-current-limiting running state. As shown in FIG. 4, when the charger operates in the constant-voltage mode, the set reference value $V_{ref}$ of the voltage is 120 V, the total output voltage $V_{out}$ of the charger is 120 V, and the total output current $I_{out}$ is 30 A. At the moment T1, when the charger comes into the total-current-limiting running state from the constant-voltage running state, the total output voltage $V_{out}$ of the charger is 114 V, thus achieving smooth switchover between the output voltages. Similarly, at the moment T2, when the charger is switched from the total-current-limiting running state to the constant-voltage running state, there is a quick and smooth response from the total output voltage without great fluctuation. This indicates that stable switchover between the control algorithms can be realized.

FIG. 5 shows an output waveform diagram of the charger, when the charger operates after the soft start ends and comes into the charging-current-limiting running state. As shown in FIG. 5, when the charger operates in the soft start mode, the set reference value $V_{ref}$ of the output voltage is 120 V, the charging current limiting value $I_{bat-ref}$ is 54 A, the total output voltage $V_{out}$ of the charger is 120 V, and the charging current $I_{bet}$ is 30 A. At the moment T3, the soft start of the charger ends, and the charger is switched from the soft start mode to the charging-current-limiting running state, the total output voltage $V_{out}$ of the charger is 116 V, $I_{bat}$ is 54 A, and smooth switchover between the output voltages can be achieved. This indicates that, by the control system for the charger, stable switchover between the running states is realized and the amount of overshoot is controlled.

FIG. 6 shows an output waveform diagram of the charger, when the charger is switched from the charging-current-limiting running state to the constant-voltage running state. As shown in FIG. 6, the set reference value $V_{ref}$ of the output voltage is 120 V, the total output voltage $V_{out}$ of the charger is 119 V, the charging current limiting value $I_{bat-ref}$ is 54 A, and the charging current $I_{bet}$ is 54 A. At the moment T4, the charger is switched from the charging-current-limiting running state to the constant-voltage running state, the total output voltage $V_{out}$ of the charger is 120 V, thus achieving smooth switchover between the output voltages. After the charger is switched to the constant-voltage mode, since the loads of the storage battery increase gradually, the value of $I_{bat}$ gradually decreases.

As shown in FIG. 4, FIG. 5 and FIG. 6, with the technical solutions of the present application, there is a quick switchover (within about 0.2 s) between modes, with a small amount of overshoot (about 5%). In each mode, the output voltage and current of the charger are steady and precise (with a fluctuation of 1% and a precision of 1%), with small fluctuation, thus achieving smooth switchover between the running modes of the charger.

During the operation of the system, the sampling data is selected by the following methods:

1. the input voltage of the charger: a real-time sampling value from the input voltage acquisition device of the charger is used;
2. the total output voltage of the charger: a real-time sampling value from the total output voltage acquisition device is used;
3. the total output current of the charger: a real-time sampling value from the total output current acquisition device is used; and
4. a charging current of the storage battery, when the sampling value $I_{bat}(k)$ is greater than $I_{bat-ref}$, the real-time sampling value is used; or otherwise, first-order low-pass filtering is performed on the sampled charging current:

$$y(k)=y(k-1)+0.05*(x(k)-y(k-1))$$

where x(k) denotes the current sampling value of the charging current, and y(k) denotes the filtered charging current.

What is claimed is:

1. A control method for a phase shifted full bridge charger using a control system as below:
   the control system comprising a sampling system and a charger controller; wherein, the sampling system comprises an input voltage acquisition device mounted at an input terminal of the charger to acquire an input voltage, a total output voltage acquisition device and a total output current acquisition device both mounted at an output terminal of the charger to respectively acquire a total output voltage and a total output current, and a charging current acquisition device mounted at an input terminal of a storage battery to acquire a charging current;
   the charger controller comprising:
   a start and running determination unit configured to receive a total output voltage signal, a total output current signal, a charging current signal and a duty ratio, and determine whether the charger operates in a waiting state, a pre-charging state, a soft start state or a running state, and generate a corresponding state signal; and the running state comprises a constant-voltage running state, a total-current-limiting running state and a charging-current-limiting running state;
   a soft start control unit configured to control the charger during the soft start state of the charger;
   a running control unit configured to control the charger in the running state of the charger and determine the running state of the charger;
   the running control unit comprising:
   a mode determination unit configured to receive a total output voltage value, a total output current value and a charging current value, to determine which running state the charger operates in, and to generate a running state signal of the charger;
   a constant-voltage control unit configured to control the charger when the charger operates in the constant-voltage running state;
   a total-current-limiting control unit configured to control the charger when the charger operates in the total-current-limiting running state;
   a charging-current-limiting control unit configured to control the charger when the charger operates in the charging-current-limiting running state;

the charger controller further comprises a smooth switchover control unit configured to receive the running state signal of the charger fed back by the mode determination unit, and a soft start state signal fed back by the start and running determination unit;
when the charger is switched between the soft start state and the running states, the control system is smoothly switched a control unit corresponding to the soft start state or the three running states of the running control unit to control a PSFB circuit connection of the charger;
the control method comprising the following steps:
determining whether the pre-charging of the charger ends; if so, the charger comes into the soft start state, and an operation of the charger is controlled by the soft start control unit;
determining whether the soft start of the charger ends; if so, the charger comes into the running state, the running control unit operates, and the smooth switchover control unit allows that a control is switched to the constant-voltage control unit;
receiving, by the mode determination unit, the total output voltage value, the total output current value and the charging current value; a total output current limiting value; and configuring, for the mode determination unit, a set value of the charging current, a total output current limiting value, a charging current limiting value, and a reference value of the total output voltage; determining the running state of the charger by the above received values and set values; and feeding an instruction for the running state of the charger back to the smooth switchover control unit;
in the constant-voltage running state, a constant-voltage control algorithm is used, however,
when $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, and the smooth switchover control unit controls the switchover to the total-current-limiting control unit; otherwise, when $$\frac{I_{bat}}{I_{bat-ref}} \rangle \frac{V_{out}}{V_{ref}} \text{ and } \frac{I_{bat}}{I_{bat-ref}} \rangle \frac{I_{out}}{I_{out-ref}},$$

the charger comes into the charging-current-limiting running state, and the smooth switchover control unit controls the switchover to the charging-current-limiting control unit; otherwise, the charger is still in the constant-voltage running state;
in the charging-current-limiting running state, a charging-current-limiting control algorithm is used, however, when $$\frac{V_{out}}{V_{ref}} \rangle \frac{I_{out}}{I_{out-ref}} \text{ and } \frac{V_{out}}{V_{ref}} \rangle \frac{I_{bat}}{I_{bat-ref}},$$

the charger comes into the constant-voltage running state, and the smooth switchover control unit controls the switchover to the constant-voltage control unit; otherwise, when $$\frac{I_{out}}{I_{out-ref}} \rangle \frac{V_{out}}{V_{ref}} \text{ and } \frac{I_{out}}{I_{out-ref}} \rangle \frac{I_{bat}}{I_{bat-ref}},$$

the charger comes into the total-current-limiting running state, and the smooth switchover control unit controls the switchover to the total-current-limiting control unit; otherwise, the charger still operates in the charging-current-limiting running state;
in the total-current-limiting running state, a total-current-limiting control algorithm is used, however, when $$\frac{V_{out}}{V_{ref}} \rangle \frac{I_{out}}{I_{out-ref}} \text{ and } \frac{V_{out}}{V_{ref}} \rangle \frac{I_{bat}}{I_{bat-ref}},$$

the charger comes into the constant-voltage running state, and the smooth switchover control unit controls the switchover to the constant-voltage control unit; otherwise, when $$\frac{I_{bat}}{I_{bat-ref}} \rangle \frac{V_{out}}{V_{ref}} \text{ and } \frac{I_{bat}}{I_{bat-ref}} \rangle \frac{I_{out}}{I_{out-ref}},$$

the charger comes into the charging-current-limiting running state, and the smooth switchover control unit controls the switchover to the charging-current-limiting control unit; otherwise, the charger still operates in the total-current-limiting running state;
in the above formulas, $V_{out}$ denotes the total output voltage value, $I_{out}$ denotes the total output current value, $I_{out-ref}$ denotes the total output current limiting value, $I_{bat}$ denotes the charging current value, $I_{bat-ref}$ denotes the charging current limiting value, and $V_{ref}$ denotes the reference value of the total output voltage.

2. The control method according to claim 1, wherein, a support capacitor is provided at an input terminal of the PSFB circuit, and it is determined whether the pre-charging ends by determining the relation between a voltage on the support capacitor in the PSFB circuit of the charger and an input voltage of the charger.

3. The control method according to claim 2, wherein, a method for determining whether the soft start of the charger ends is as follows: when condition 1 or condition 2 or condition 3 or condition 4 is fulfilled, it is determined that the soft start of the charger ends, wherein,
condition 1, when a cumulative duty ratio is greater than a set value of a duty ratio;

$$\text{duty} = \frac{V_{ref}}{V_1} * N,$$

where duty denotes the set value of the duty ratio, $V_1$ denotes a sampling value for the input voltage, and N denotes a transformation ratio of a charger transformer;
condition 2: the total output voltage $V_{out}$ is greater than a set value of the total output voltage $V_{os}$;
condition 3: the total output current $I_{out}$ is greater than a set value of the total output current $I_{os}$; and
condition 4: the charging current $I_{bat}$ is greater than a set value of the charging current $I_{bs}$.

4. The control method according to claim 2, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bet-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

5. The control method according to claim 3, wherein, $V_{os}$=0.98$V_{ref}$, $I_{os}$=0.98$I_{out-ref}$, $I_{bs}$=0.98$I_{bat-ref}$.

6. The control method according to claim 3, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[e(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bat-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

7. The control method according to claim 5, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[e(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bat-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

8. The control method according to claim 1, wherein, a method for determining whether the soft start of the charger ends is as follows: when condition 1 or condition 2 or condition 3 or condition 4 is fulfilled, it is determined that the soft start of the charger ends, wherein, condition 1, when a cumulative duty ratio is greater than a set value of a duty ratio;

$$duty = \frac{V_{ref}}{V_1} * N,$$

where duty denotes the set value of the duty ratio, $V_1$ denotes a sampling value for the input voltage, and N denotes a transformation ratio of a charger transformer;
condition 2: the total output voltage $V_{out}$ is greater than a set value of the total output voltage $V_{os}$;
condition 3: the total output current $I_{out}$ is greater than a set value of the total output current $I_{os}$; and
condition 4: the charging current $I_{bat}$ is greater than a set value of the charging current $I_{bs}$.

9. The control method according to claim 8, wherein, $V_{os}=0.98V_{ref}$, $I_{os}=0.98I_{out-ref}$, $I_{bs}=0.98I_{bat-ref}$.

10. The control method according to claim 8, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bat-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

11. The control method according to claim 9, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[e(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bat-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

12. The control method according to claim 1, wherein, the constant-voltage control algorithm, the total-current-limiting control algorithm and the charging-current-limiting control algorithm are all PI control algorithm, with three different groups of PI parameters being used:

$$u(k) = u(k-1) + \left(K_P + \frac{T}{2}K_I\right)e(k) + \left(\frac{T}{2}K_I - K_P\right)e(k-1),$$
$$= u(k-1) + K_P[e(k) - e(k-1)] + \frac{T}{2}K_I[(k) + e(k-1)]$$

where T denotes a sampling frequency;
as for the constant-voltage control algorithm:

$$e(k) = 1 - \frac{V_{out}(k)}{V_{ref}},$$

where $V_{out}(k)$ denotes a current sampling value of the total output voltage of the charger;
as for the total-current-limiting control algorithm:

$$e(k) = 1 - \frac{I_{out}(k)}{I_{out-ref}},$$

where $I_{out}(k)$ denotes a current sampling value of the total output current of the charger; and,
as for the charging-current-limiting control algorithm:

$$e(k) = 1 - \frac{I_{bat}(k)}{I_{bat-ref}},$$

where $I_{bat}(k)$ denotes a current sampling value of the charging current;
when the soft start ends, a value of the current cumulative duty ratio DUTY is used as an input to the constant-voltage control unit, the total-current-limiting control unit and the charging-current-limiting control unit; wherein, DUTY=duty(t)+Δduty.

* * * * *